United States Patent
Abu Alhaol et al.

(10) Patent No.: US 12,302,162 B2
(45) Date of Patent: May 13, 2025

(54) METHODS AND PROCESSES TO ENABLE RNN-GNN-BASED NETWORK DIGITAL TWIN FOR O-RAN

(71) Applicant: Dell Products L.P., Round Rock, TX (US)

(72) Inventors: Ibrahim Abu Alhaol, Nepean (CA); Javad Mirzaei, Toronto (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/365,575

(22) Filed: Aug. 4, 2023

(65) Prior Publication Data

US 2025/0048170 A1 Feb. 6, 2025

(51) Int. Cl.
*H04L 45/02* (2022.01)
*H04W 28/02* (2009.01)

(52) U.S. Cl.
CPC ......... *H04W 28/0236* (2013.01); *H04L 45/08* (2013.01)

(58) Field of Classification Search
CPC ............................ H04W 28/0236; H04L 45/08
See application file for complete search history.

(56) References Cited

U.S. PATENT DOCUMENTS

| | | | | |
|---|---|---|---|---|
| 2022/0350943 A1* | 11/2022 | van den Berghe | ..... | G06F 30/20 |
| 2024/0118702 A1* | 4/2024 | Cella | ................ | G05B 19/4155 |
| 2024/0144141 A1* | 5/2024 | Cella | ................ | G06Q 10/06375 |

FOREIGN PATENT DOCUMENTS

| | | | | |
|---|---|---|---|---|
| WO | WO-2022133330 A1 * | 6/2022 | .............. | B22F 10/70 |
| WO | WO-2023174786 A1 * | 9/2023 | .............. | G06N 20/00 |
| WO | WO-2023208394 A1 * | 11/2023 | | |

OTHER PUBLICATIONS

A.I. Multiple. (Nov. 9, 2022). Digital twin applications and use cases by industry. Retrieved from https://research.aimultiple.com/digital-twin-applications/ [research.aimultiple.com].

Liu, M., Fang, S., Dong, H. and Xu, C., 2021. Review of digital twin about concepts, technologies, and industrial applications. Journal of Manufacturing Systems, 58, pp. 346-361.

Siemens. (n.d.). Digital twin. Retrieved Nov. 9, 2022, from https://www.plm.automation.siemens.com/global/en/ourstory/glossary/digital-twin/24465 [plm.automation.siemens.com].

Vercator. (n.d.). How to make a digital twin: the options, types and outputs. Retrieved May 21, 2021 from https://info.vercator.com/blog/how-to-make-a-digital-twin-the-options-types-and-outputs [info.vercator.com].

(Continued)

*Primary Examiner* — Philip C Lee
(74) *Attorney, Agent, or Firm* — Workman Nydegger

(57) ABSTRACT

One example method includes using a network digital twin of a communications network to perform operations including monitoring, on an ongoing basis, a status of the communications network as the communication network changes, maintaining synchronization between the communications network and the network digital twin based on changes to the status, and the status changes are determined using information gathered during the monitoring, and using the network status to make a prediction regarding performance of the communications network.

18 Claims, 8 Drawing Sheets

(56) References Cited

OTHER PUBLICATIONS

Tributech. (n.d.). The digital twin—an introduction. Retrieved Nov. 5, 2022, from https://www.tributech.io/blog/the-digital-twin [tributech.io].

XMPRO. (n.d.). Digital twins: The ultimate guide. Retrieved May 21, 2021, from https://xmpro.com/digital-twins-the-ultimate-guide/ [xmpro.com].

International Telecommunication Union (ITU). (n.d.). Digital twin network—Requirements and architecture. Retrieved from https://www.itu.int/rec/T-REC-Y.3090 [itu.int].

Polese M, Bonati L, D'Oro S, Basagni S, Melodia T. (2022). Understanding O-RAN: Architecture, interfaces, algorithms, security, and research challenges. arXiv preprint arXiv:2202.01032.

Bonati L et. al. (2021). Intelligence and learning in O-RAN for data-driven NextG cellular networks. IEEE Communications Magazine, 59(10), 21-27.

O-RAN Alliance. (2022, November 9). O-RAN Architecture Description 7.0. Retrieved from https://orandownloadsweb.azurewebsites.net/specifications [orandownloadsweb.azurewebsites.net].

OpenAI Cellular. (n.d.). OpenAI Cellular documentation. Retrieved Jun. 2022 from https://openaicellular.github.io/oaic [openaicellular.github.io].

Tang, B., Shah, V.K., Marojevic, V. and Reed, J.H., 2023. AI Testing Framework for Next-G O-RAN Networks: Requirements, Design, and Research Opportunities. IEEE Wireless Communications, 30(1), pp. 70-77.

De Mulder, W., Bethard, S. and Moens, M.F., 2015. A survey on the application of recurrent neural networks to statistical language modeling. Computer Speech & Language, 30(1), pp. 61-98.

Wu, Z., Pan, S., Chen, F., Long, G., Zhang, C. and Philip, S.Y., 2020. A comprehensive survey on graph neural networks. IEEE transactions on neural networks and learning systems, 32(1), pp. 4-24.

Koller, D. and Friedman, N., 2009. Probabilistic graphical models: principles and techniques. MIT press.

O-RAN Alliance. (n.d.). Technical Specification "O-RAN Information Model and Data Models Specification". Available at: https://www.o-ran.org/blog/o-ran-alliance-introduces-48-new-specifications-released- [o-ran.org] since-Jul. 2021.

Geng, X. et al. (Jan. 2019). Spatiotemporal multi-graph convolution network for ride-hailing demand forecasting. In Proceedings of the AAAI Conference on Artificial Intelligence, 33(1), 3656-3663.

Yu, B., Yin, H., & Zhu, Z. (Jul. 2019). ST-UNet: A spatio-temporal U-network for graph-structured time series modeling. arXiv preprint arXiv:1903.05631.

Guo, K. et al. (Feb. 2021). Optimized graph convolution recurrent neural network for traffic prediction. IEEE Intelligent Transportation Systems Magazine, 22(2), 1138-1149.

Li, Y., Yu, R., Shahabi, C., & Liu, Y. (Feb. 2018). Diffusion convolutional recurrent neural network: Data-driven traffic forecasting. In Proceedings of the 35th International Conference on Machine Learning, pp. 1-16.

Yu, B., Yin, H., & Zhu, Z. (Jul. 2017). Spatio-temporal graph convolutional networks: A deep learning framework for traffic forecasting. arXiv preprint arXiv:1709.04875.

Guo, S., Lin, Y., Feng, N., Song, C., & Wan, H. (Jul. 2019). Attention based spatial-temporal graph convolutional networks for traffic flow forecasting. In Proceedings of the AAAI Conference on Artificial Intelligence, 33(1), 922-929.

International Search Report and Written Opinion received for PCT Patent Application No. PCT/US2023/078029, mailed on Apr. 3, 2024, 20 pages.

Mashaly M., "Connecting the Twins: A Review on Digital Twin Technology & its Networking Requirements", Procedia Computer Science vol. 184, Mar. 23-26, 2021, pp. 299-305.

\* cited by examiner

US 12,302,162 B2

METHODS AND PROCESSES TO ENABLE RNN-GNN-BASED NETWORK DIGITAL TWIN FOR O-RAN

FIELD OF THE INVENTION

Embodiments of the present invention generally relate to the creation and use of digital twins. More particularly, at least some embodiments of the invention relate to systems, hardware, software, computer-readable media, and methods, for the creation and use of a digital twin for networks, such as communication networks for example.

BACKGROUND

An O-RAN (open radio access network) is a complex and dynamic system with many interconnected components, making it challenging to accurately model the O-RAN behavior for optimization and performance evaluation. The existing approaches for modeling O-RAN lack the capability to capture both the temporal and spatial aspects of the network, leading to a low-fidelity NDT (network digital twin) and limitations in generalizability and scalability.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
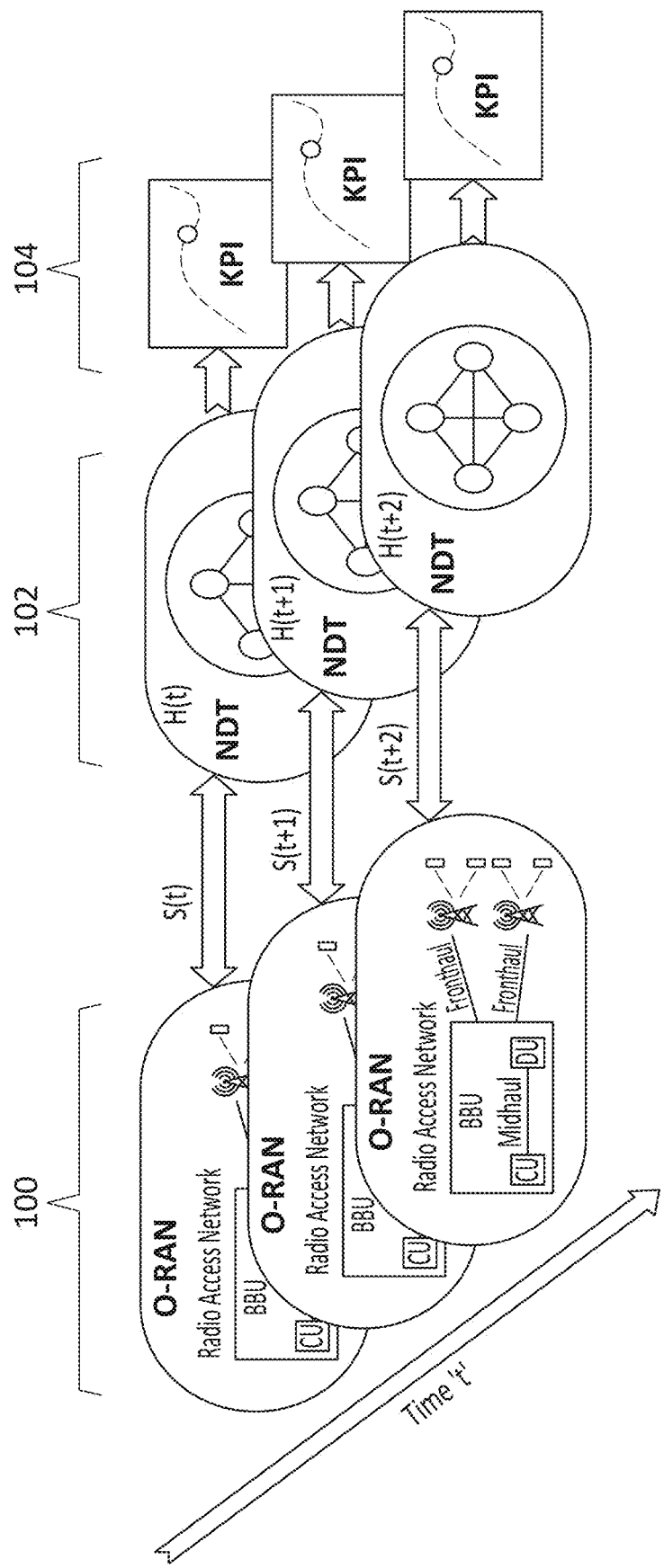
FIG. 1 discloses aspects of a high-level depiction of an NDT according to an example embodiment.

Embodiments of the present invention generally relate to the creation and use of digital twins. More particularly, at least some embodiments of the invention relate to systems, hardware, software, computer-readable media, and methods, for the creation and use of a digital twin for networks, such as communication networks for example.

In one example embodiment of the invention, a digital twin (DT) of an entity is created and implemented. In an embodiment, the entity comprises a communications network, such as an O-RAN (Open Radio Access Network), but the scope of the invention is not limited to any particular entity, or communications network. In an embodiment, an entity such as an actual O-RAN network may have a status, S (t), at time 't' that is in synchronization with an NDT (network digital twin). Because the O-RAN status may evolve dynamically, both the O-RAN and NDT continuously update each other to maintain synchronization. Using the updated network status at any given time, the NDT is able to make predictions regarding one or more KPIs (key performance indicators) of the O-RAN, and make those predictions available to the O-RAN.

In more detail, an NDT according to one embodiment of the invention may use a dynamic graph-based RNN-GNN (recurrent neural network—graph neural network) model to capture temporal, and spatial, relationships, and connectivity, of network components. In particular, in one embodiment, the GNN component may capture spatial relationships between the components, and use this information to model the connectivity and interdependence of the components. The RNN component may capture dynamic and temporal relationships between different nodes, such as network components, and use this information to model network behavior over time. The outputs of the RNN-GNN model may then be used to predict, in real-time, the behavior, such as the future network status, of the O-RAN for which the NDT was constructed. In this way, an embodiment of the invention may provide proactive network management and optimization.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that network status can be ascertained, and action taken to optimize the network, in real-time. An embodiment may consider the dynamic and uncertain nature of edge relationships between network components, and use that information to predict the state of an O-RAN. An embodiment may optimize resource allocation, improve network performance, and/or, identify potential network issues. Various other advantages of one or more example embodiments will be apparent from this disclosure.

A. REFERENCES

Reference may be made herein to one or more of the following 22 documents, each of which is incorporated herein in its respective entirety by this reference. Such references may be made using the indicated numerical designators [X].

[1] A.I. Multiple. (2022 November 9). Digital twin applications and use cases by industry. Retrieved from research.aimultiple.com.
[2] Liu, M., Fang, S., Dong, H. and Xu, C., 2021. *Review of digital twin about concepts, technologies, and industrial applications. Journal of Manufacturing Systems*, 58, pp. 346-361.
[3] Siemens. (n.d.). Digital twin. Retrieved Nov. 9, 2022, from www.plm.automation.siemens.com
[8] Polese M, Bonati L, D'Oro S, Basagni S, Melodia T. (2022). *Understanding O-RAN: Architecture, interfaces, algorithms, security, and research challenges. arXiv preprint* arXiv: 2202.01032.
[9] Bonati L et. al. (2021). *Intelligence and learning in O-RAN for data-driven NextG cellular networks. IEEE Communications Magazine*, 59(10), 21-27.
[4] Vercator. (n.d.). How to make a digital twin: the options, types and outputs. Retrieved May 21, 2021 from info.vercator.com.
[5] Tributech. (n.d.). The digital twin—an introduction. Retrieved Nov. 5, 2022, from www.tributech.io.
[6] XMPRO. (n.d.). Digital twins: The ultimate guide. Retrieved May 21, 2021, from xmpro.com.
[7] International Telecommunication Union (ITU). (n.d.). Digital twin network-Requirements and architecture. Retrieved from www.itu.int.
[10] O-RAN Alliance. (2022 November 9). O-RAN Architecture Description 7.0.Retrieved from orandownloadsweb.azurewebsites.net.
[11] OpenAI Cellular. (n.d.). OpenAI Cellular documentation. Retrieved June 2022 from openaicellular.github.io.
[12] Tang, B., Shah, V. K., Marojevic, V. and Reed, J. H., 2023. *AI Testing Framework for Next-G O-RAN Networks: Requirements, Design, and Research Opportunities. IEEE Wireless Communications*, 30(1), pp. 70-77.
[13] De Mulder, W., Bethard, S. and Moens, M. F., 2015. *A survey on the application of recurrent neural networks to statistical language modeling. Computer Speech & Language*, 30(1), pp. 61-98.
[14] Wu, Z., Pan, S., Chen, F., Long, G., Zhang, C. and Philip, S. Y., 2020. *A comprehensive survey on graph neural networks. IEEE transactions on neural networks and learning systems*, 32(1), pp. 4-24.
[15] Koller, D. and Friedman, N., 2009. *Probabilistic graphical models: principles and techniques*. MIT press.
[16] O-RAN Alliance. (n.d.). Technical Specification "O-RAN Information Model and Data Models Specification". Available at: www.o-ran.org.
[17] Geng, X. et al. (2019 January). *Spatiotemporal multi-graph convolution network for ride-hailing demand forecasting. In Proceedings of the AAAI Conference on Artificial Intelligence*, 33(1), 3656-3663.
[18] Yu, B., Yin, H., & Zhu, Z. (2019 July). *ST-UNet: A spatio-temporal U-network for graph-structured time series modeling. arXiv preprint arXiv:* 1903.05631.
[19] Guo, K. et al. (2021 February). *Optimized graph convolution recurrent neural network for traffic prediction. IEEE Intelligent Transportation Systems Magazine*, 22(2), 1138-1149.
[20] Li, Y., Yu, R., Shahabi, C., & Liu, Y. (2018 February). *Diffusion convolutional recurrent neural network: Data-driven traffic forecasting. In Proceedings of the 35th International Conference on Machine Learning*, pp. 1-16.
[21] Yu, B., Yin, H., & Zhu, Z. (2017 July). *Spatio-temporal graph convolutional networks: A deep learning framework for traffic forecasting. arXiv preprint arXiv:* 1709.04875.
[22] Guo, S., Lin, Y., Feng, N., Song, C., & Wan, H. (2019 July). *Attention based spatial-temporal graph convolutional networks for traffic flow forecasting. In Proceedings of the AAAI Conference on Artificial Intelligence*, 33(1), 922-929.

B. OVERVIEW

An embodiment of the invention comprises a comprehensive approach for creating a high-fidelity network digital twin (NDT) for Open Radio Access Network (O-RAN). Such an embodiment may thus comprise at least two useful aspects, namely, modeling a network with a combination of Recurrent Neural Networks (RNN) and Graph Neural Networks (GNN), and enhancing the accuracy of the NDT modeling.

An NDT according to one example embodiment incorporates RNN and GNN to improve scalability, accuracy, efficiency, and adaptability, as well as various techniques to model the uncertainty inherent in edge relations between nodes in the proposed RNN-GNN-based model. Thus, a benefit of an NDT according to one embodiment is that the NDT can represent real-time O-RAN behavior for optimization and performance evaluation, leading to cost-effective solutions that help network operators reduce expenses, improve efficiency, and improve customer experience by providing faster, more reliable, and more efficient network services.

C. CONTEXT FOR AN EMBODIMENT OF THE INVENTION

In an embodiment, an NDT is a virtual replica of a physical network that can be used for simulation, optimization, and monitoring [1]-[7]. In the context of Open Radio Access Network (O-RAN), an NDT can be utilized to emulate the network behavior in real-time, including but not limited to the state of various components, to optimize network performance, predict and prevent failures, and use resources effectively [8]-[12].

Building an NDT for an O-RAN entails overcoming several challenges, including data availability and quality, model complexity and scalability, validation, and testing, as well as integration and deployment. One problem with building NDT for O-RAN is that the network is highly dynamic and distributed, making it challenging to accurately model the state of the network at any given time. Additionally, the network may be composed of many different types of components, such as radio units, basebands, and switches, which can interact with each other in complex ways and possess uncertain and variable relationships. Thus, an example embodiment of the invention comprises methods and processes that deal with the problem of model complexity, accuracy, and scalability using Recurrent Neural Networks (RNN), Graph Neural Networks (GNN), and probabilistic graph modeling (PGM).

In general, RNNs operate to process sequential data, such as time series or natural language. They are beneficial for tasks that involve understanding the context of a sequence [13]. On the other hand, GNNs process graph-structured data, such as social networks or molecular structures. They are used for tasks that involve understanding the relationships between entities in a graph, such as node classification or link prediction [14]. Finally, Probabilistic Graphical Models (PGMs) provide a way to represent complex relationships between variables and effectively model uncertainty caused by dynamic network conditions and interdependencies between components. Specifically, Bayesian networks or Markov random fields can be used to represent uncertainty in the graph representation, potentially mitigating the effects of uncertainty in the O-RAN modeling. All these techniques are potentially helpful in the context of O-RAN-modeling, but they have not been combined and employed together as disclosed herein. RNNs and GNNs can be used to model the dynamics of the network over time and understand the relationships between different components, while PGMs can be used to model the probabilistic relationships between various components of the network and reason about uncertainty [16].

D. GENERAL ASPECTS OF AN EMBODIMENT

Following is a brief discussion of some general aspects of an embodiment of the invention. These are provided only by way of example and are not intended to limit the scope of the invention in any way. In general, an example embodiment may provide a comprehensive approach to create a high-fidelity network digital twin (NDT) for O-RAN. The existing architecture and models [17]-[22] can generate simplified models for specific use cases, but they lack generalizability, scalability, and accuracy. The O-RAN network is complex and dynamic with many interconnections, making it challenging to accurately emulate its behavior for optimization and performance evaluation. Thus, methods according to an example embodiment deal with the issues of spatiotemporal modeling and model fidelity to create an accurate NDT for O-RAN.

For example, an embodiment may provide for comprehensive modeling of an O-RAN. As noted herein, the O-RAN is a complex and dynamic system with many interconnected components, making it challenging to accurately model its behavior for optimization and performance evaluation. Conventional approaches for modeling O-RAN lack the capability to capture both the temporal and spatial aspects of the network, leading to low-fidelity NDTs and limitations in generalizability and scalability. Thus, an example embodiment of the invention may effectively address these challenges and accurately emulate the real-time behavior of the O-RAN network.

As another example, an embodiment may provide high fidelity and scalability in the creation and use of an NDT. Accurately modeling the behavior of the O-RAN may be important for optimization and performance evaluation, but conventional approaches for creating its NDT face limitations in accuracy and scalability. This is due to the uncertain and variable relationships between components being overlooked. Thus, an example embodiment may operate to address these limitations and accurately represent the complex and dynamic nature of the O-RAN network. In an embodiment, the incorporation of stochastic modeling to capture these relationships using a probabilistic graph model (PGM) may improve the accuracy and scalability of the NDT and provide a more comprehensive representation of the network than is achievable with conventional approaches.

E. DETAILED DESCRIPTION OF AN EXAMPLE EMBODIMENT

One example embodiment leverages a combination of RNNs and spatio-temporal GNNs to provide an approach for modeling the dynamic aspects of the O-RAN Network. In an embodiment, RNNs may be well suited for modeling sequential data and capturing the temporal dynamics of the O-RAN, including variations in O-RAN topology, traffic patterns, and component failures over time. Furthermore, RNNs may be trained to predict future network behavior based on historical data inputs. By incorporating GNNs, an embodiment of the model may provide the ability to handle graph-structured data, learn powerful representations of nodes and edges in a graph, and scale to large graphs. The combination of RNNs and GNNs is a robust approach for modeling the dynamic aspects of O-RAN in an NDT.

Further, the incorporation of GNNs may provide benefits in modeling the spatial relationships and connectivity between different network components. GNNs may be effective in capturing the underlying structure of the network and interactions between components, such as the relationships between base stations and user equipment. The combination, in one example embodiment, of RNNs and GNNs results in an NDT that accurately models both the temporal and spatial aspects of the O-RAN network, providing a holistic view of the varied dynamics of the network. This approach may enable real-time prediction of network behavior, including the location and state of various components, which may be important for network optimization and performance evaluation.

To further enhance the fidelity and scalability of the NDT, an example embodiment of the invention may integrate stochastic modeling of the relationships between nodes through a probabilistic graph model. This approach may enable the capturing of the uncertain and varying relationships between components of the O-RAN, leading to increased accuracy of the NDT. Additionally, in an embodiment, incorporating a probabilistic graph model may enhance scalability, flexibility, and efficiency by modeling a more significant number of edge relations between the nodes in the network. Incorporating PGM into GNNs can enhance scalability and efficiency by capturing richer edge relations between nodes. The implementation may involve representing the edges as conditional probability distributions from the PGM. This integration allows the GNN to encode and learn from the inherent uncertainty and variability in node interactions, leading to a deeper understanding of graph dynamics.

E.1 Example Embodiment of an NDT for an O-RAN Network

With attention now to FIG. 1, there is disclosed an overview of an example configuration, and associated operations, of an NDT according to one example embodiment of the invention. As shown there, an O-RAN network 100 is modeled with an NDT 102. The O-RAN network 100 has a status, S (t), at time 't' that is in synchronization with the NDT 102. In the example of FIG. 1, three different times are indicated at which the status of the O-RAN network 100 is obtained, namely, the status is obtained at times 't,' 't+1' and 't+2.' These are provided only by way of example and the status of the O-RAN network 100 may be obtained any number of times, and at any time(s). The of the O-RAN network 100 status evolves dynamically over time, and both the O-RAN 100 and NDT 102 continuously update each other to maintain synchronization. Using the updated of the O-RAN network 100 status at any given time, the NDT 102 is able to make predictions regarding the O-RAN network 100 KPIs 104 (key performance indicators). In the following sections, a detailed discussion is provided of an NDT, according to one embodiment of the invention, that comprises a RNN-GNN architecture that is operable to forecast future KPIs 104 for the O-RAN network 100 based on the accumulated O-RAN network 100 status information 'S.'

Figure 2:
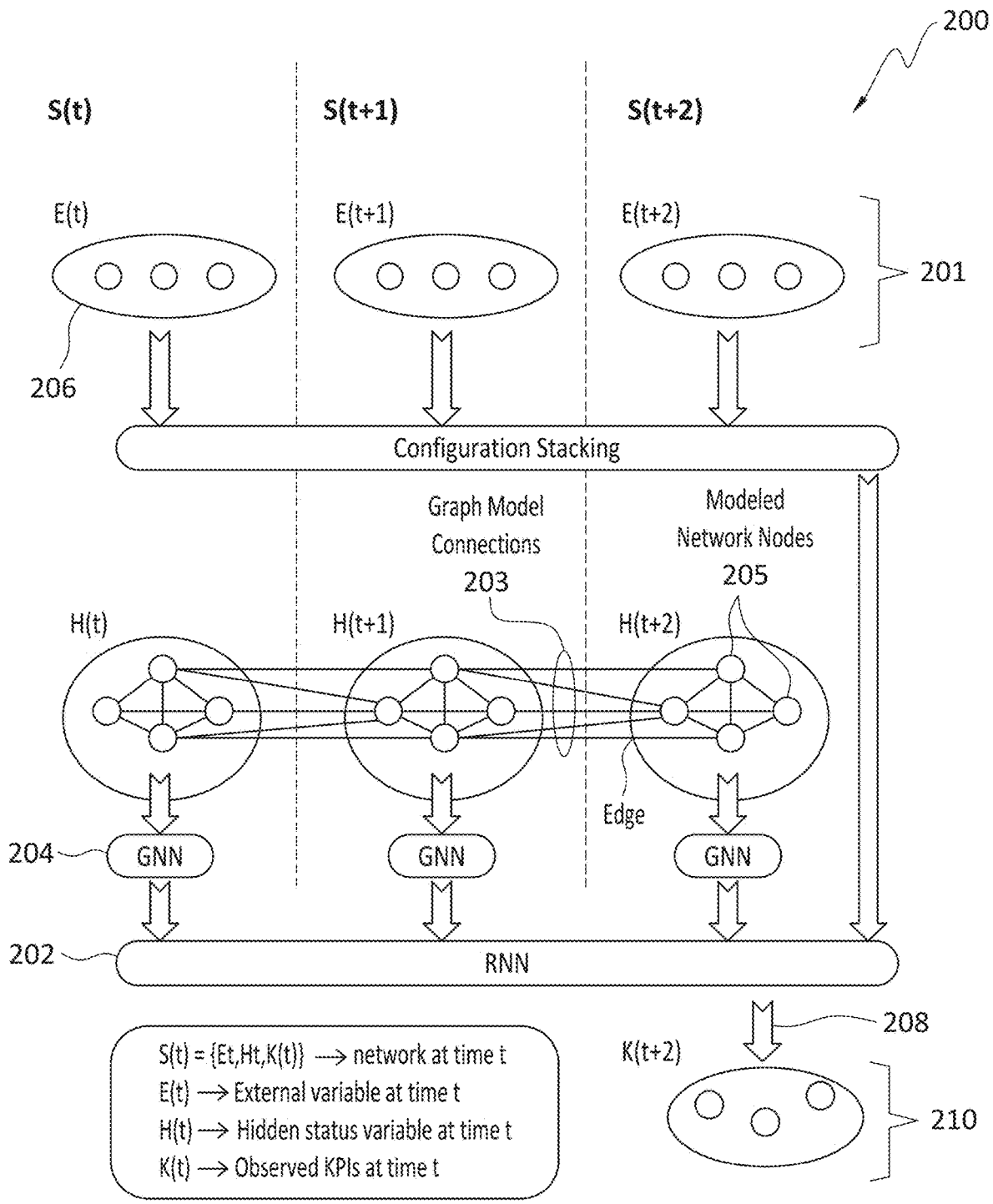
FIG. 2 discloses aspects of dynamic graph-based RNN-GNN NDT model for an O-RAN network, according to an example embodiment.

With reference now to FIG. 2, there is disclosed a dynamic graph-based RNN-GNN NDT model 200 for an O-RAN network, shown as element 201 of the model 200. In particular, the example embodiment of FIG. 2 utilizes a dynamic graph-based RNN 202-GNN 204 model to capture the state 'S' of the O-RAN network, where the state in this example comprises both the temporal and spatial relationships and connectivity of the O-RAN network components, shown as elements 206 of the model 200, at various times 't.' This approach may enable the holistic modeling of the O-RAN network, considering the NDT temporal and spatial aspects.

In an embodiment, the RNN component 202 of the model 202 captures the dynamic and temporal relationships between different network components of the O-RAN network. The RNN component 202 may operate to capture the changes in the O-RAN network behavior over time. On the other hand, the GNN component 204 may operate to capture the spatial relationships between the O-RAN network components, modeling the connectivity and interdependence of those O-RAN network components.

Note that in FIG. 2, graph model connections 203, or edges, are shown as connecting various modeled network nodes 205. In an embodiment, these graph model connections 203 of the NDT 200 may vary according to changing conditions in the O-RAN network that is being modeled. Thus, the graph model connections 203 are not fixed but, instead, comprise a sample of the conditions occurring between connected network nodes 205. The sample may, in an embodiment, comprise a distribution of numbers with differing respective probabilities that reflect the reality that the O-RAN network is dynamic in terms of its configuration, and operations including communications and, as a result, the relationships between nodes 205 tend to change over time.

With continued attention to the example of FIG. 2, the outputs 208 of the dynamic graph-based RNN-GNN model may be used to predict the behavior, as indicated, for example, by the respective values of one or more KPIs 210, of the O-RAN network in real-time, including the future network status. This enables proactive network management and optimization. It is noted that, for the sake of simplicity and illustration, the architecture presented in FIG. 2 considers three-time instances (t, t+1, t+2). However, this can be extended to consider more time instances, with the number of time instances being a hyper-parameter that can be determined through validation and testing. The flexibility of the NDT model 200 to handle a varying number of time instances makes it versatile and applicable to a broad range of O-RAN network scenarios.

With continued reference to FIG. 2, the NDT model 200 is disclosed as a graph of O-RAN network entities, both physical and virtual, that change dynamically over time. For example, the NDT model 200 status, or 'state,' at time t+2 is represented by S (t+2), and the hidden variables H (t+2) are derived from the relationships between H (t+1) and H (t) at times t+1 and t, respectively. The expected output of the NDT model 200 is the observed O-RAN KPIs 210 at time t+2, represented by K (t+2). In an embodiment then, a goal of the NDT model 200 is to predict future KPIs, such as the KPIs 210 for example. In an embodiment, the NDT model 200 formulation may be abstracted as shown by the following equations:

$$S(t+2) = \{E(t+2), H(t+2), K(t+2)\} \quad [1]$$

$$H(t+2) = \text{Fun}\,\mu(H(t), H(t+1)) \quad [2]$$

$$GNN(t+2) = \text{Fun}\,\pi(H(t+2)) \quad [3]$$

$$CONF(t+2) = \text{Fun}\,\alpha(E(t+2), E(t+1), E(t)) \quad [4]$$

$$K(t+2) = \text{Fun}\,\beta(GNN(t), GNN(t+1), GNN(t+2), CONF(t+2)) \quad [5]$$

In an embodiment, Equation [1] provides all the O-RAN network hidden, external, and observed variables at time t+2. An embodiment may assume a fully connected graph between all variables between H(t), H(t+1), and H(t+2). The function Fun $\beta(\cdot)$ is mapping GNN outputs, that is, Fun $\pi(\cdot)$), and the stacked external variables (CONF(t+2)) into the network KPIs 210, that is, K (t+2)). Table 1 discloses some example operations of various functions according to one embodiment of the invention.

E.2 Further Discussion

As apparent from this disclosure, an embodiment of the invention may comprise various useful aspects, examples of which are discussed below. Note that these examples are for the purposes of illustration and are not intended to limit the scope of the invention in any way.

For example, an embodiment of the invention may provide scalable spatiotemporal modeling. In particular, the scalable spatiotemporal modeling approach according to an embodiment of the invention comprises the combination of RNN and spatiotemporal GNN to model both the temporal and spatial aspects of an O-RAN network. This approach may enable the capture of both temporal dynamics and spatial dependencies in the data by utilizing RNNs for modeling temporal sequences of data, and using GNNs for modeling the spatial relationships between components. In an embodiment, this scalable spatiotemporal modeling approach is particularly relevant in the context of O-RAN networks, as it effectively models both the time-varying wireless signals and complex network topologies. This scalable spatiotemporal modeling approach may also be used to improve network performance, optimize resource allocation, and identify potential network issues, leading to a more comprehensive understanding of the structure of the O-RAN network, and its operations.

As another example, an embodiment of the invention may constitute an improvement, relative to conventional approaches, in fidelity of an NDT model to the O-RAN network that the NDT model represents. In particular, in one embodiment, the utilization of PGM (probabilistic graph modeling) in the modeling of O-RAN networks brings a relatively higher level of accuracy to NDT modeling. By considering the dynamic, and uncertain, nature of edge relationships between O-RAN network components, this approach may provide a more realistic and accurate representation of the O-RAN network. This contrasts with traditional GNN-based models that assume fixed-edge relationships and do not capture real-world uncertainties. With the ability to consider these uncertainties, an NDT model according to one embodiment may better predict the future state of the O-RAN network that is being modeled, and may also provide more informed decisions for optimizing performance, allocating resources, and identifying potential network issues.

Thus, an NDT according to an embodiment may provide a comprehensive solution for improving O-RAN network performance. The ability of such an NDT to constantly monitor the O-RAN network in real time enables the NDT to identify changes in O-RAN network conditions and adjust resource allocation as necessary to maintain high energy efficiency. It is noted that the examples provided herein are a few of the many potential applications of an embodiment of an NDT, as the NDT may also be used to improve other aspects of the O-RAN network, such as energy efficiency, security, and resource management. Also, holistic models incorporating all KPIs, configurations, and hidden variables may provide a better modeling approach that covers more scenarios, leading to an even more comprehensive solution.

F. EXAMPLES/USE CASES

Table 2 provides a non-exhaustive list of selected O-RAN Key Performance Indicators (KPIs) that may be helpful in evaluating the performance of an O-RAN network. Table 3 provides a non-exhaustive list of configuration parameters that may impact the functionality and performance of an O-RAN. Table 4 show the primary components of the example O-RAN architecture represented as hidden state (see, e.g., H (t) in FIG. 2). All data generated by such components may be integrated into a single unified data model, defining the data structures, formats, and types utilized by the components. Tables 2 to 4 thus provide examples of O-RAN KPIs, configuration parameters, and components, respectively.

Figure 3:
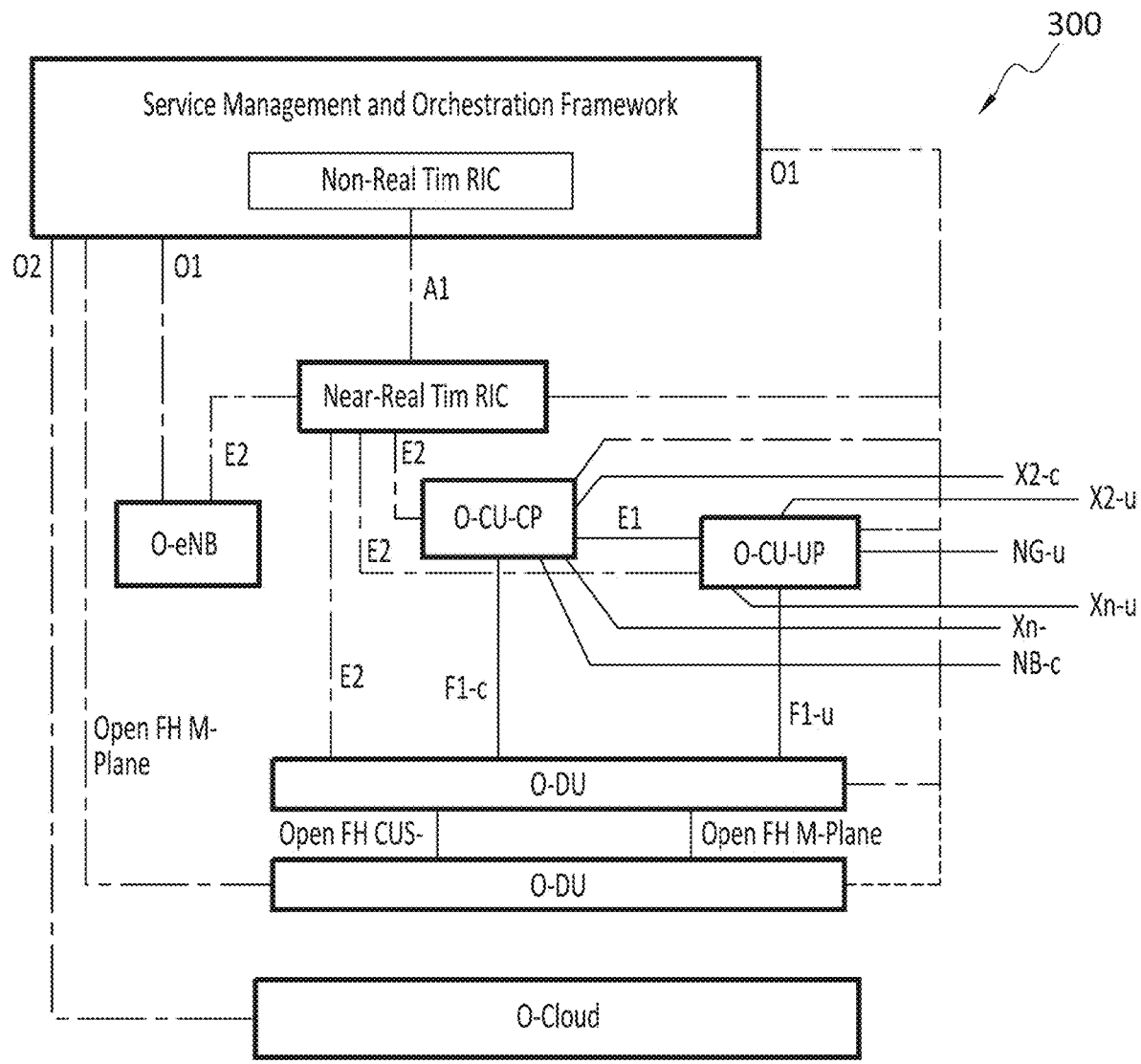
FIG. 3 present the standard O-RAN logical architecture.

In an embodiment, an O-RAN architecture comprises various interfaces, examples of which are listed in Table 5. In an embodiment, these interfaces enable may enable the virtualization of the O-RAN and core network, resulting in greater flexibility and scalability within the O-RAN architecture. This virtualization may enable separation of the user plane and the control plane, as well as the deployment of various Radio Units (RUs) and Distributed Units (DUs). The structure of an example O-RAN 300 such as may be modeled by a NDT according to one embodiment of the invention, including the main components and interfaces of the O-RAN 300, is disclosed in FIG. 3, and further detailed in reference incorporated herein.

Following are some example use cases for an embodiment of the invention. These are provided by way of illustration, and are not intended to limit the scope of the invention in any way. Note that a single NDT according to one embodiment is configured and operable to perform any, and all, of the example use cases discussed below.

F.1 Example Use Case 1-Minimizing Latency

In one embodiment of the invention, the RNN-GNN based NDT may be used to optimize any of the KPIs provided in Table 2. The combination of RNN and GNN in the NDT improves scalability, flexibility, and efficiency by allowing for the handling of substantial amounts of data and dynamic network conditions. The RNN-GNN-based NDT effectively models and optimizes the complex relationships between O-RAN components listed in Table 4, and the O-RAN configuration variables listed in Table 3, producing a real-time, accurate representation of the network topology and performance.

Figure 4:
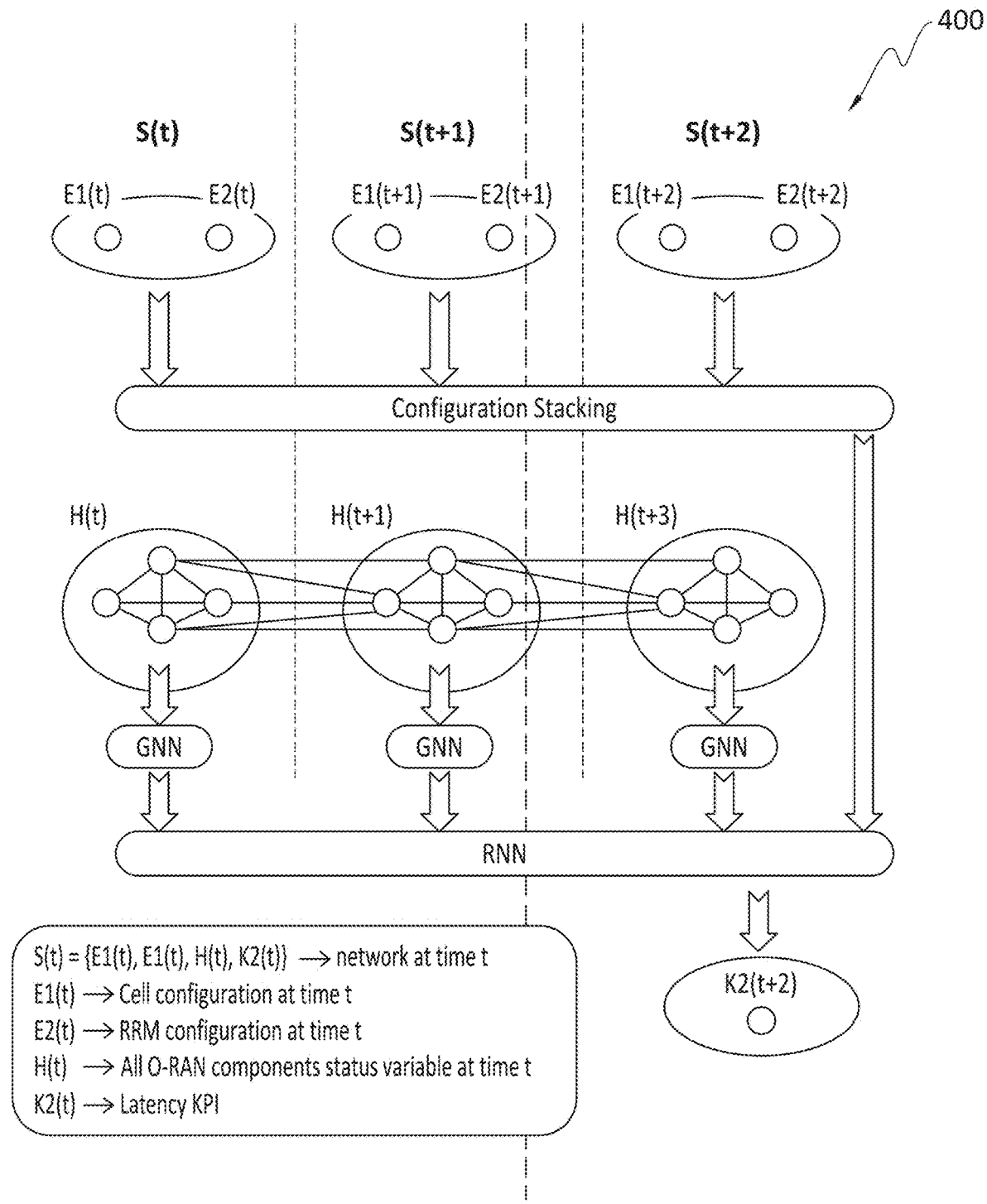
FIG. 4 discloses an O-RAN network NDT for latency predictions, according to an example embodiment.

FIG. 4 discloses aspects of the use of an NDT, according to one embodiment, to forecast latency within the O-RAN that is modeled by the NDT. In particular, an NDT 400 leverages historical network data to analyze and predict O-RAN network behavior, enabling network operators to proactively identify and address potential issues before those issues cause latency. In an embodiment, the formulation to minimize O-RAN latency using an NDT is to forecast latency KPI K2(t)) based on the status of hidden O-RAN components, namely, H (t)) and cell configuration E1(t)), and RRM configuration E2(t), as disclosed in FIG. 4. By predicting and thus improving latency, the operator may optimize network resources and prevent congestion, ensuring a low-latency experience for users. For example, suppose the NDT predicts high latency on a particular cell in the O-RAN network. In that case, the operator may take measures to minimize latency, such as redirecting traffic to other cells, or adding additional resources to the impacted cell.

F.2 Example Use Case 2-Maximizing Network Throughput

Figure 5:
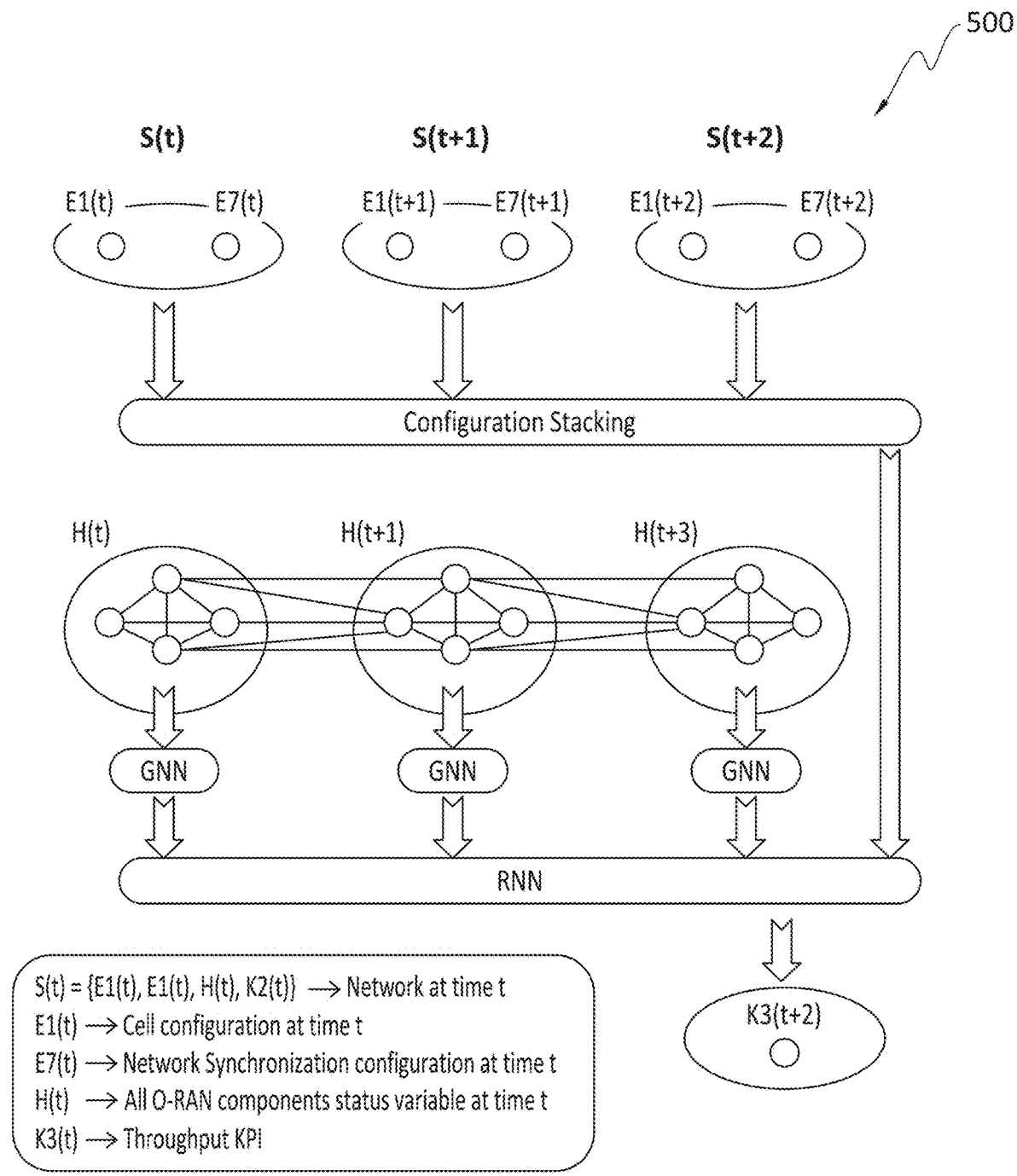
FIG. 5 discloses an O-RAN network NDT for throughput predictions, according to an example embodiment.

With attention now to FIG. 5, there is disclosed an example NDT 500 configured and operable to forecast throughput in an O-RAN network modeled by the NDT 500. In particular, the NDT 500 may be used as a part of a solution for improving O-RAN performance by maximizing throughput, as it is presented in Table 2 KPI of O-RAN including throughput are listed, specifically, throughput KPI K3(t) in the example of FIG. 5. One of the features of an embodiment of an NDT, such as the NDT 500, is its ability to model the O-RAN network topology. By creating a digital representation of the O-RAN network topology, including the locations of base stations, the number of connected devices, and the throughput of each link, an NDT according to an embodiment may provide a complete understanding of the network's structure and layout. This information may then be used to analyze the O-RAN network and predict expected throughput on each link in the O-RAN network.

A method for maximizing O-RAN network throughput, using an NDT according to one example embodiment, may comprising forecasting the throughput K3(t) based on the status of hidden O-RAN components H(t), cell configuration E1(t), and network synchronization configuration E7(t), as shown in the example NDT 500 of FIG. 5. By accurately predicting O-RAN throughput, an operator may optimize network resources and enhance the user experience. For instance, if the NDT 500 predicts low throughput on a particular link, the operator can take action to improve it by adding more resources to the affected cell.

Another aspect of an NDT according to an embodiment, such as the NDT 500, is its ability to determine optimal resource allocation. By analyzing the predicted O-RAN network throughput, the NDT 500 may determine the optimal allocation of resources such as frequency bands and power levels, to maximize the overall O-RAN network throughput. This may ensure that the O-RAN network is operating at its maximum capacity and providing the best possible performance for users. The O-RAN parameter configuration that are included in Table 3 provides some examples relating to optimal resource allocation.

F.3 Example Use Case 3-Improving O-RAN Energy Efficiency

Following the same methodology provided in predicting latency and throughput, an NDT according to one embodiment may be used for improving O-RAN network energy efficiency and reducing operating costs. The NDT in this example may be based on the KPI of O-RAN listed in Table 2, and may be used to create a digital representation of the O-RAN network topology, including the physical and virtual components of the O-RAN network topology. The NDT may analyze the O-RAN network topology, historical data on traffic and signal strength, and the energy consumption of each component in the network to predict the expected energy consumption of the network. By analyzing the predicted energy consumption, the NDT may determine the optimal allocation of resources, such as frequency bands and power levels for example, to minimize energy consumption while maintaining O-RAN network performance. The NDT may continuously monitor the O-RAN network in real-time and make adjustments to the resource allocation as needed to minimize energy consumption. Additionally, an NDT according to an embodiment may predict energy-efficient operation scenarios and provide insights on how to achieve them, for example, by turning off or reducing power to base stations or devices that are not in use, or by adjusting the transmission power of devices to minimize energy consumption. By using the NDT to model the network, predict energy consumption, and make real-time adjustments, operators may improve O-RAN network energy efficiency and reduce the operating costs.

G. EXAMPLE METHODS

It is noted with respect to the disclosed methods, including the example methods of FIGS. 1-5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

G.1 Creation of an Example NDT

Figure 6A:
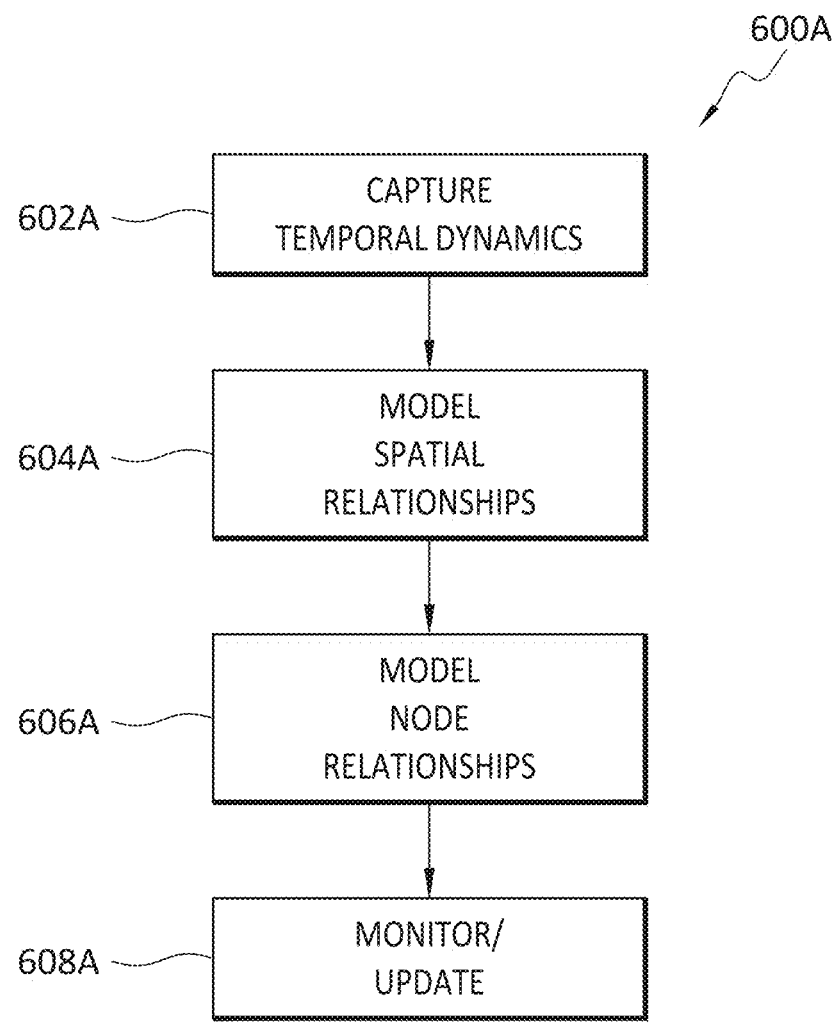
FIG. 6a discloses a method for creating an NDT according to one example embodiment.

With reference now to FIG. 6a, a method according to one example embodiment is generally denoted at 600A. The method 600A may be used to create and/or modify an NDT that comprises a model of a communications network. In an embodiment, part or all of the method 600A may be performed by the NDT itself, although that is not necessarily required. In an embodiment, modification of the NDT may be performed on an ongoing, and possibly real-time, basis in response to changes occurring in the communications network.

The example method 600A may begin with the capturing 602B of temporal dynamics of the communications network of interest. In an embodiment, the capturing 602B may be performed by an RNN.

As well, information spatial relationships among components of the communications network may be captured 604A. Such components may include base stations, cell towers, mobile communication devices such as cell phones, and any other components of, or operating in, the communications network. In an embodiment, the spatial relationship information may be used by a GNN to determine spatial relationships among the components of the communications network.

Next, information indicating relationships between nodes of the communications network may be gathered 606A. In an embodiment, this information may be stochastically modeled using a PGM.

When the NDT has been completed, the communications network that is modeled by the NDT may then be monitored 608A, such as by the NDT, and the NDT updated as needed to reflect ongoing changes in/to the communications network. In an embodiment, the NDT may be used to make predictions about aspects of the structure and operation of the communications network, and the predictions used to change one or more of such aspects.

G.2 Operation of an Example NDT

Figure 6B:
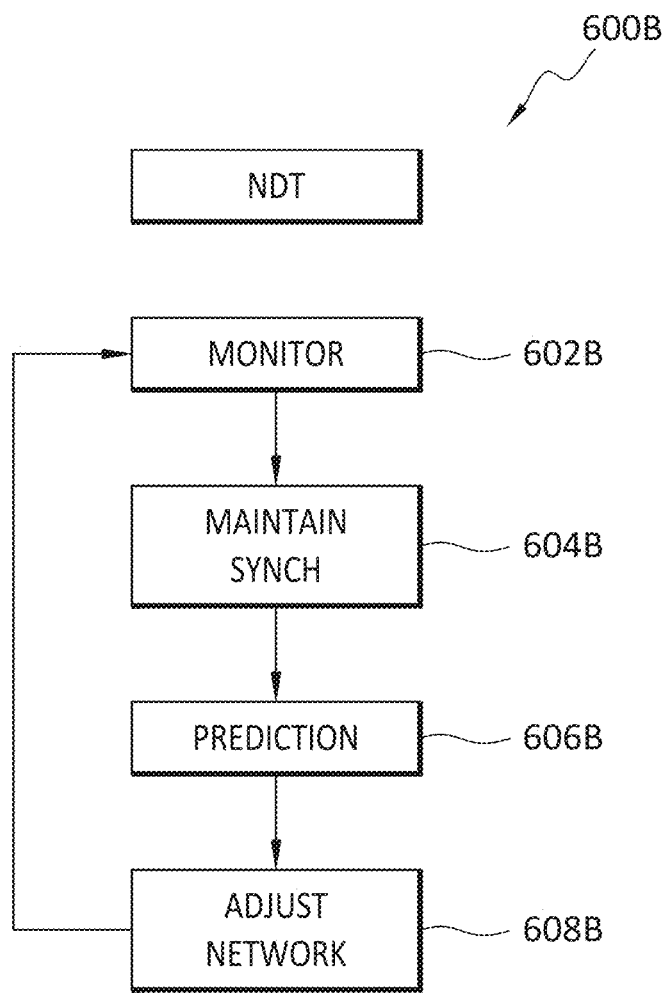
FIG. 6b discloses a method of operating an NDT according to one example embodiment.

Turning next to FIG. 6B, a method according to one example embodiment is generally denoted at 600B. In an embodiment, the method 600B may be performed by a network digital twin that models a communications network, such as an O-RAN for example.

The example method 600B may begin with the monitoring 602B of a communications network. The monitoring 602B may gather information about the status of the communications network, such as temporal, and spatial, aspects of the communications network.

The information gathered during the monitoring 602B may be used to maintain synchronization 604B between the communications network and a NDT. For example, the NDT may update itself so that the model embodied by the NDT maintains fidelity to the actual configuration and conditions of the communications network, as those are reflected in the status.

The status of the network may then be used as a basis to make one or more predictions 606B related to the configuration and/or operation of the communications network. In an embodiment, the predictions may comprise particular values of one or more KPIs of the communications network.

Finally, one or more aspects of the communications network may be adjusted 608B based on the predictions 606B that were made. Such aspects may include, but are not limited to, temporal aspects of the communications network, and spatial aspects of the communications network.

H. FURTHER EXAMPLE EMBODIMENTS

Following are some further example embodiments of the invention. These are presented only by way of example and are not intended to limit the scope of the invention in any way.

Embodiment 1. A method, comprising: with a NDT of a communications network, performing operations comprising: monitoring, on an ongoing basis, a status of the communications network as the communication network changes; maintaining synchronization between the communications network and the network NDT on changes to the status, and the status changes are determined using information gathered during the monitoring; and using the network status to make a prediction regarding performance of the communications network.

Embodiment 2. The method as recited in any preceding embodiment, wherein a recurrent neural network of the NDT captures temporal dynamics of the communications network, and the temporal dynamics are used to make the prediction.

Embodiment 3. The method as recited in any preceding embodiment, wherein a graph neural network of the network digital twin captures information about spatial relationships and connectivity between components of the communications network, and the information is used to make the prediction.

Embodiment 4. The method as recited in any preceding embodiment, wherein the prediction comprises a key performance indicator of the communications network.

Embodiment 5. The method as recited in any preceding embodiment, wherein the communications network comprises an open radio access network.

Embodiment 6. The method as recited in any preceding embodiment, wherein the prediction comprises a key performance indicator of the communications network, and the key performance indicator is used as a basis for adjusting the performance of the communications network.

Embodiment 7. The method as recited in any preceding embodiment, wherein the network digital twin comprises information about relationships between nodes of the communications network that were modeled with a probabilistic graph model.

Embodiment 8. The method as recited in any preceding embodiment, wherein the network digital twin models temporal aspects, and spatial aspects, of the communications network.

Embodiment 9. The method as recited in any preceding embodiment, wherein the prediction is made in real time while the communications network is operating.

Embodiment 10. The method as recited in any preceding embodiment, wherein the network digital twin models connections between nodes of the communications network as variable connections.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

I. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
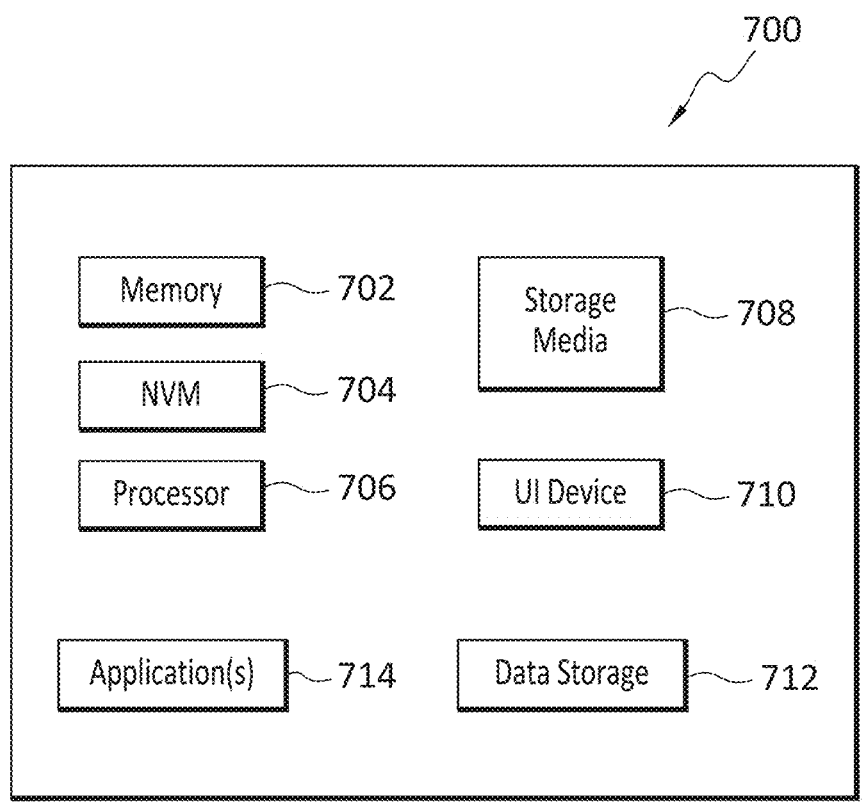
FIG. 7 discloses an example computing entity configured and operable to perform any of the disclosed methods, processes, and operations.

With reference briefly now to FIG. 7, any one or more of the entities disclosed, or implied, by FIGS. 1-6, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein. In an embodiment, the physical computing device 700 may comprise, instead of a hardware processor 706, other hardware components such as a CPU (central processing unit) and/or GPU (graphics processing unit), and may further comprise a Unix® OS (operating system) to orchestrate use of these processing elements.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing, with a network digital twin of a communications network, operations comprising:
    monitoring, on an ongoing basis, a status of the communications network as the communication network changes;
    maintaining synchronization between the communications network and the network digital twin based on changes to the status, wherein the status changes are determined using information gathered during the monitoring; and
    using the monitored status to make a prediction regarding performance of the communications network based on temporal dynamics among components of the communications network over time, spatial relationships among the components of the communications network, and connectivity among the components of the communications network,
    wherein the prediction comprises a latency of the communications network, which is predicted further based on a radio resource management configuration,
    wherein the prediction comprises a throughput of the communications network, which is predicted further based on a network synchronization configuration, and
    wherein the communications network comprises an open radio access network.

2. The method as recited in claim 1, wherein a recurrent neural network of the network digital twin captures the temporal dynamics of the communications network, and the temporal dynamics are used to make the prediction.

3. The method as recited in claim 1, wherein a graph neural network of the network digital twin captures information about the spatial relationships and the connectivity among the components of the communications network, and the information is used to make the prediction.

4. The method as recited in claim 1, wherein the prediction comprises a key performance indicator of the communications network.

5. The method as recited in claim 1, wherein the prediction comprises a key performance indicator of the communications network, and the key performance indicator is used as a basis for adjusting the performance of the communications network.

6. The method as recited in claim 1, wherein the network digital twin comprises information about relationships between nodes of the communications network that were modeled with a probabilistic graph model.

7. The method as recited in claim 1, wherein a network digital twin models temporal aspects and spatial aspects of the communications network.

8. The method as recited in claim 1, wherein the prediction is made in real time while the communications network is operating.

9. The method as recited in claim 1, wherein the network digital twin models the connectivity among the components of the communications network as variable connections.

10. A non-transitory storage medium having stored therein instructions that are executable by one or more hardware processors to:
    perform, with a network digital twin of a communications network, a method comprising:
        monitoring, on an ongoing basis, a status of the communications network as the communication network changes;
        maintaining synchronization between the communications network and the network digital twin based on changes to the status, and the status changes are determined using information gathered during the monitoring; and
        using the network status to make a prediction regarding performance of the communications network based on temporal dynamics among components of the communications network over time, spatial relationships among the components of the communications network, and connectivity among the components of the communications network,
    wherein the prediction comprises a latency of the communications network, which is predicted further based on a radio resource management configuration,
    wherein the prediction comprises a throughput of the communications network, which is predicted further based on a network synchronization configuration, and
    wherein the communications network comprises an open radio access network.

11. The non-transitory storage medium as recited in claim 10, wherein a recurrent neural network of the network digital twin captures the temporal dynamics of the communications network, and the temporal dynamics are used to make the prediction.

12. The non-transitory storage medium as recited in claim 10, wherein a graph neural network of the network digital twin captures information about the spatial relationships and connectivity among the components of the communications network, and the information is used to make the prediction.

13. The non-transitory storage medium as recited in claim 10, wherein the prediction comprises a key performance indicator of the communications network.

14. The non-transitory storage medium as recited in claim 10, wherein the prediction comprises a key performance indicator of the communications network, and the key performance indicator is used as a basis for adjusting the performance of the communications network.

15. The non-transitory storage medium as recited in claim 10, wherein the network digital twin comprises information about relationships between nodes of the communications network that were modeled with a probabilistic graph model.

16. The non-transitory storage medium as recited in claim 10, wherein a network digital twin models temporal aspects and spatial aspects of the communications network.

17. The non-transitory storage medium as recited in claim 10, wherein the prediction is made in real time while the communications network is operating.

18. The non-transitory storage medium as recited in claim 10, wherein the network digital twin models the connectivity among the components of the communications network as variable connections.

* * * * *